(12) United States Patent
Raymakers et al.

(10) Patent No.: US 12,126,058 B2
(45) Date of Patent: Oct. 22, 2024

(54) CELL PLATE ASSEMBLY FOR A SOLID-STATE COMPRESSOR, SOLID-STATE COMPRESSOR AND METHOD FOR OPERATING A SOLID-STATE COMPRESSOR

(71) Applicant: HYET HOLDING B.V., Arnhem (NL)

(72) Inventors: Leonard Raymakers, Arnhem (NL); Jonne Konink, Arnhem (NL)

(73) Assignee: HyET Holding B.V., Arnhem (NL)

( * ) Notice: Subject to any disclaimer, the term of this patent is extended or adjusted under 35 U.S.C. 154(b) by 739 days.

(21) Appl. No.: 17/296,025

(22) PCT Filed: Nov. 21, 2019

(86) PCT No.: PCT/NL2019/050770
§ 371 (c)(1),
(2) Date: May 21, 2021

(87) PCT Pub. No.: WO2020/106152
PCT Pub. Date: May 28, 2020

(65) Prior Publication Data
US 2022/0013792 A1     Jan. 13, 2022

(30) Foreign Application Priority Data
Nov. 23, 2018   (NL) ...................................... 2022065

(51) Int. Cl.
*H01M 8/026*     (2016.01)
*C25B 1/02*      (2006.01)
(Continued)

(52) U.S. Cl.
CPC .............. *H01M 8/026* (2013.01); *C25B 1/02* (2013.01); *C25B 9/19* (2021.01); *C25B 9/60* (2021.01); *H01M 8/1004* (2013.01)

(58) Field of Classification Search
CPC . F02M 37/0023; F02M 23/006; F02M 35/024
See application file for complete search history.

(56) References Cited

U.S. PATENT DOCUMENTS

| | | |
|---|---|---|
| 8,795,526 B2 | 8/2014 | Matsumoto et al. |
| 9,186,624 B2 | 11/2015 | Blanchet |

(Continued)

FOREIGN PATENT DOCUMENTS

| | | |
|---|---|---|
| CN | 101925395 A | 12/2010 |
| CN | 105473497 A | 4/2016 |

(Continued)

OTHER PUBLICATIONS

Shen et al., "Cehmical Engineering Unit Operation", 2009, pp. 360-362, Tianjin University Press, Tianjin City, China.

(Continued)

*Primary Examiner* — Jacob M Amick
*Assistant Examiner* — Charles J Brauch
(74) *Attorney, Agent, or Firm* — The Webb Law Firm

(57) ABSTRACT

The invention relates to a cell plate assembly for adjoining an anode side of a membrane electrode assembly of a solid-state compressor, including adjacent first and second cell plates, each having a channel structure incorporated therein. The second cell plate includes a number of passages typically connecting the therein incorporated channel structure with the anode side of the membrane electrode assembly. The channels of the respective channel structures are interconnected at the interfacing surfaces of the first and second cell plates, wherein the channels incorporated in the second cell plate enclose an angle with the channels incorporated in the first cell plate. The invention further relates to a solid-state compressor including a cell plate assembly according to the invention and a method for operating such a solid-state compressor.

15 Claims, 4 Drawing Sheets

(51) Int. Cl.
     *C25B 9/19*           (2021.01)
     *C25B 9/60*           (2021.01)
     *H01M 8/1004*     (2016.01)

(56) References Cited

U.S. PATENT DOCUMENTS

| | | |
|---|---|---|
| 10,266,429 B2 | 4/2019 | Legzdins |
| 2004/0040862 A1 | 3/2004 | Kosek et al. |
| 2016/0204452 A1 | 7/2016 | Uwani |
| 2018/0100243 A1 | 4/2018 | Yakumaru et al. |

FOREIGN PATENT DOCUMENTS

| | | | | |
|---|---|---|---|---|
| CN | 108002517 A | 5/2018 | | |
| CN | 108800370 A | 11/2018 | | |
| EP | 3041075 A1 * | 7/2016 | ……… | H01M 8/0258 |
| EP | 3306725 A1 * | 4/2018 | ………… | C25B 1/02 |
| JP | 2016506288 A | 3/2016 | | |
| WO | 2015029353 A1 | 3/2015 | | |

OTHER PUBLICATIONS

Strobel et al., "The compression of hydrogen in an electrochemical cell based on a PE fuel cell design", Journal of Power Sources, 2002, vol. 105, pp. 208-215.

\* cited by examiner

CELL PLATE ASSEMBLY FOR A SOLID-STATE COMPRESSOR, SOLID-STATE COMPRESSOR AND METHOD FOR OPERATING A SOLID-STATE COMPRESSOR

CROSS-REFERENCE TO RELATED APPLICATIONS

This application is the United States national phase of International Application No. PCT/NL2019/050770 filed Nov. 21, 2019, and claims priority to The Netherlands Patent Application No. 2022065 filed Nov. 23, 2018, the disclosures of which are hereby incorporated by reference in their entirety.

BACKGROUND OF THE INVENTION

Field of the Invention

The present invention relates to a cell plate assembly for adjoining an anode side of a membrane electrode assembly of a solid-state compressor. The invention further relates to a first cell plate and a second cell plate for use in a cell plate assembly according to the invention. The invention also relates to solid-state compressor for electrochemically compressing a fluid, comprising a cell plate assembly according to the invention. Last, the invention relates to a method for operating such a solid-state compressor.

Description of Related Art

Where conventional mechanical compressors utilize mechanical means such as pistons or rotors for the compression of a fluid, solid-state compressors rely on the electrochemical transport of said fluid through a membrane using an ionic transport mechanism. In order to compress the working fluid in an electrochemical manner, a solid-state compressor typically comprises a compressor cell that is made up of one or more stacked membrane electrode assemblies (also known as MEA's). The electrodes of the MEA are connected to a power supply for maintaining an electric potential difference across the electrodes. This potential difference is necessary to electrochemically move the ionized working fluid through the proton exchange membrane (commonly known as a PEM) against the pressure gradient that exists across the membrane. The direction of the electrical current hereby determines the direction of the ionic transport, wherein the low-pressure working fluid is ionized at the positively charged anode and recombined with the separated electrons at the high-pressure cathode side of the MEA.

Solid-state compressors have a number of significant advantages over mechanical compressors. Namely, solid-state compressors have no moving parts and generally have a compact design. Moreover, solid-state compressors allow fluids to be compressed to very large pressures up to and above 1000 bar at operating efficiencies exceeding those of mechanical compressors. As an additional advantage, electrochemical compression also leads to the purification of the working fluid as the membrane allows for the transport of the ionized working fluid only.

A commonly known solid-state compressor is the electrochemical hydrogen compressor wherein hydrogen is fed to the membrane electrode assembly and oxidized to protons and electrons. The protons are then driven through the membrane and the electrons are transferred via an external circuit, after which the protons and electrons are reduced back to molecular hydrogen. In this process, the hydrogen moves against a pressure gradient from an area of low pressure to an area of high pressure, resulting in the pressure rise across the membrane. The compression of other working fluids, such as water or ammonia are however also possible.

For the supply of working fluid to the low-pressure (anode) side of the membrane electrode assembly, the working fluid is typically transported through a number of channels that run parallel to the membrane electrode assembly. These channels may be arranged in a flow-by configuration wherein the channels are on one side connected to a feed line for feeding the working fluid to the multiple channels and on an opposite side connected to an exhaust line for discharging the fraction of the working fluid that is not transported through the membrane. A possible drawback of this flow-by configuration is that a recirculation process may be necessary for recycling the excess working fluid gathered by the exhaust.

As an alternative, the channels may be arranged in a dead-end configuration wherein the channels are on one side connected to the feed line, but wherein the opposing side of said channels are designed as a dead end. This flow field design forces the working fluid to pass through the membrane only instead of allowing a fraction of the working fluid to bypass the membrane. An advantage of this channel configuration is that the need for a recirculation process as mentioned above is prevented. However, this channel configuration has its own drawback related to the fact that the proton exchange membrane has a purification function, only permitting transport of ionized working fluid.

No feed stream of working fluid will be completely pure. Any impurities (such as nitrogen and liquid water) present in the working fluid will accumulate near the dead ends of the channels as the impurities cannot move through the membrane. The accumulated impurities will thereby at least partly block the net flow of working fluid in the direction of the dead ends, thus reducing the mass transport of working fluid through the membrane. This non-optimal mass transport of working fluid directly affects the effectiveness and productivity of the solid-state compressor.

An object of the invention is therefore to improve the supply of working fluid to the low-pressure (anode) side of the membrane electrode assembly, or at least provide for an alternative to the above-mentioned solutions.

SUMMARY OF THE INVENTION

The invention thereto proposes a cell plate assembly for adjoining an anode side of a membrane electrode assembly of a solid-state compressor, comprising: a first cell plate having a first channel structure incorporated therein comprising multiple channels extending over at least part of the cell plate and running parallel to a first surface of the cell plate, and a second cell plate comprising a first surface interfacing the first surface of the first cell plate and having a second channel structure incorporated therein comprising multiple channels extending over at least part of the cell plate and running parallel to the first surface of the cell plate, wherein the channels of the respective channel structures are interconnected at the interfacing surfaces of the first and second cell plates and wherein the second cell plate comprises a number of passages connecting the therein incorporated second channel structure with a second surface of the second cell plate opposing the first surface of the second cell plate, wherein the channels incorporated in the second cell plate enclose an angle with the channels incorporated in the first cell plate.

A channel according to the invention is to be understood as a recess with a depth less than a thickness of a first cell plate from a first surface.

In other words the device according to the present invention thus comprises a first cell plate, having a length and a depth, comprising a first channel structure incorporated therein, comprising multiple channels extending over at least part of the cell plate, at least with a length more than half of the length of the first cell plate and running parallel to a first surface of the cell plate, with the multiple channels recessed with a depth less than the depth of the first cell plate from a first surface, and running parallel to the first surface of the cell plate and also comprises a second cell plate, having a length and a depth, comprising a first surface interfacing the first surface of the first cell plate and having a second channel structure incorporated therein comprising multiple channels recessed with a depth that is less than the depth of the second cell plate, and thus forming a recessed channel partly through the plate from the first surface of the cell plate, extending over at least part of the cell plate, of the plate and running parallel to the first surface of the cell plate, alongside the interfacing surfaces.

This configuration optimizes the working fluid distribution, such that that the working fluid is distributed in an optimal way before passing through the number of passages to the second surface of the second cell plate. Preferably the channels have preferably at least a length more than half of the length of the first cell plate.

At the core of a solid-state compressor lies a membrane electrode assembly, comprising a proton exchange membrane sandwiched between two electrodes that make up the anode and cathode respectively. The above-mentioned cell plate assembly is positioned at the anode side, which makes up the low-pressure side of the membrane electrode assembly. The cell plate assembly functions as a flow field plate assembly by means of which the low-pressure working fluid, through the channels of the channel structures of the first and second cell plates, is supplied to said anode side. The second surface of the second cell plate of the cell plate assembly hereby faces the membrane electrode assembly, and in a possible configuration directly contacts said membrane electrode assembly.

The working fluid first passes through the multiple channels of the channel structure of the first cell plate. These channels typically run parallel to each other such that the individual channels do not cross each other. As the channels extend over at least part of the cell plate parallel to the first surface of the cell plate, which first surface runs parallel to the membrane surface, the working fluid is transported through said channels in direction alongside the membrane surface. The second cell plate interfaces (contacts) the first cell plate first surface with a first surface thereof. The channel structures of the first and second cell plates are interconnected at this interfacing surface, making it possible for the working fluid to flow into the channels of the second cell plate channel structure. As the channels of the latter channel structure also extend over at least part of the cell plate parallel to the first surface of the cell plate, which first surface also runs parallel to the membrane surface, the working fluid is transported through said channels in direction alongside the membrane surface. The multiple channels of the channel structure of the second cell plate also typically run parallel to each other such that the individual channels do not cross each other.

Given the channels incorporated in the second cell plate enclose an angle with the channels incorporated in the first cell plate, the direction of the flow of working fluid will be different between said channels. The enclosure of an angle must hereby be understood as any angle other than 0 degrees, causing the channels of the first and second cell plate channel structures to cross over. At the cross-over points, the channels of the second cell plate are connected with the channels of the first cell plate, thereby interconnecting the different parallel channels of the channel structure of the first cell plate. As a result, the working fluid in the separate channels in the first cell plate will be laterally redistributed by the channels in the second cell plate, enhancing the uniformness of the mass transport over the membrane surface. In addition, with a redistribution of the working fluid, the impurities present in the working fluid will also be more uniformly distributed over the channels of the second cell plate. The accumulation of impurities will therefore to a lesser extent affect the distribution of working fluid over the membrane surface. Because the accumulation of impurities has a smaller impact on the distribution of working fluid over the membrane surface and thus the compressor performance, cleaning of the channel structures can be performed at extended intervals.

The cleaning of the channel structures is performed through purging, which entails letting the working fluid flow through the channels in a reverse direction. This can be effected by reversing the direction of the electrical current, changing the polarity of the electrodes and thereby reversing the electrochemical transport of the working fluid through the membrane. Due to the interconnection of the individual channels of the first cell plate channel structure by means of the channels of the second cell plate channel structure, the purging effectiveness is improved. Namely, the interconnections will do away with any dead ends in the channels of the interconnected channel structure that would otherwise trap impurities present in the working fluid. As a result of the lack of dead ends the backflow of working fluid and any impurities therein are now able to flow in a single direction thereby clearing the channels.

It is possible that the channels of the second channel structure run substantially perpendicular to the channels of the first channel structure, meaning that channels of the second channel structure and the channels of the first channel structure enclose an angle of about 90 degrees. Letting the channels of the first and second cell plate channel structures cross at approximately 90 degree angles will leads to an even more uniform lateral redistribution of working fluid over the channels of the second plate channel structure. Moreover, the perpendicular arrangement of the channels creates the least amount over overlap between the channels, which in turn will lead to a stronger construction better able to cope with the very large pressure differences that exist between the inside and outside of the channels. Namely, the pressures the cell plates are subjected to commonly equal or exceed the pressures of the pressured working fluid at the cathode side of the membrane electrode assembly, while the pressures inside the channels of the cell plate assembly equal that of the low-pressure working fluid.

In a preferred embodiment of the cell plate assembly according to the invention, the channels of the first channel structure have a diameter exceeding that of the channels of the second channel structure. The coarser channels of the first channel structure are preferred from a mass transport point of view as the larger diameter of these channels namely allows for a larger flow rate of working fluid and minimizes clogging of the channels due to accumulation of impurities. The finer channel structure of the second cell plate on the other hand allows for a more even distribution of working fluid over the second cell plate surface while still retaining a load baring capacity necessary to deal with the pressure differentials. The spacing between subsequent channels of the second channel structure is commonly chosen smaller than the spacing between subsequent channels of the first channel structure. The channels of the second cell plate channel structure have holes along their length at a side of the channels facing the second surface of the second cell plate, thereby creating the passages connecting the channels with the second cell plate second surface. An even spreading of and small spacing between these holes will improve the distribution of working fluid over the anode side of the membrane surface. Therefore, the spacing between the holes of two adjacent channels is preferably kept as small as possible, which is accomplished through a small spacing between adjacent second cell plate channels. This smaller spacing is however only possible if the diameter of these second cell plate channels is kept smaller than the further spaced apart but larger diameter first cell plate channels in order to avoid compromising the cell plate integrity due to an excess of open spacing.

As mentioned before, the channels of the second cell plate channel structure are provided with small holes along their length to allow the working fluid to diffuse to the second surface of the second cell plate. If these holes are small enough, generally in the range of 100 micrometres or less, the second cell plate is able to directly support the membrane electrode assembly. As the differences in pressure between the low-pressure and compressed working fluid are usually very high, an equally high pressure differential exists over the different sides of the membrane electrode assembly. The membrane, which commonly consists of a thin polymer layer, therefore needs to be supported sufficiently. In case the holes in the second cell plate channels are too large, the membrane will under influence of the large pressure differential be pushed through these holes, which may result in rupture of the membrane.

The first cell plate channel structure is commonly connected to a feed line for feeding a working fluid to the channels of said channel structure. This feed line may connect to the individual channels of the channel structure via one or more subdivisions of said feed line. Typically, the feed line has a larger diameter than the channels of the first cell plate channel structure to have enough capacity to supply the working fluid to each of said first cell plate channels.

As another way of increasing the supply capacity, the first cell plate channel structure may be connected to at least two separate feed lines, each connecting to different, and preferably opposing ends of the channel structure. Another advantage of feeding the first cell plate channel structure at multiple ends thereof is that better mass transport distribution of working fluid over the channels of the channel structure can be achieved.

In a possible embodiment of the cell plate assembly, the first plate channel structure comprises two separate channel systems, each connected to a different one of the separate feed lines, wherein the channels of the separate channel systems are dead ending. This dead-end configuration of the channel system, the working fluid in the channels of the first cell plate will flow in a single direction from the single feed line towards the channels of the second cell plate channel structure, which benefits the throughput of working fluid. By using multiple channel systems, the supply of working fluid can be distributed over multiple feed lines while each channel system remains connected to a single feed line only.

For as far as the channel structure of the second cell plate do not redistribute any impurities present in the working fluid, said impurities will at least partly accumulate near the dead ends of the channels to the point that the diffusion rate of the impurities towards the feed line is at least partly counters the flow of working fluid towards the dead ends. This results in a decreased concentration of working fluid over the length of the channels towards the dead ends. In order to redistribute the problem of accumulation of impurities, the channels of the separate channel systems may enclose one another, thereby forming an interdigitated channel structure wherein subsequent channels are part of different channel systems. Due to this interdigitated dead-end configuration of the channel systems a more uniform distribution of the working fluid over de membrane can thus be achieved despite the presence of accumulated impurities.

Alternatively, the channel structure may comprise a single, continuous channel system, the channels of which are at opposing ends thereof connected to separate feed lines. This channel configuration lacks the dead ends inherent to the above-described dead-end configurations, as a result of which impurities will not accumulate locally inside the first cell plate channels. The impurities will therefore not affect the distribution of working fluid over the membrane to the same extend as would be the case with any of the above-described dead-end configurations. It is also possible that one of the feed lines functions as an exhaust such that channels are effectively arranged in a flow-by configuration.

The channel structures of the first and second cell plates may be formed by elongated recesses provided in the first surfaces of the first and second cell plates. These elongated recesses are easily formed in the cell plates by for example a milling process without compromising the inherent strength and load bearing capabilities of the cell plate material. By placing the recessed part of the respective first surfaces of the first and second cell plates directly onto each other, closed channels are formed that stand in contact with each other at the points where the recesses in the respective cell plates intersect.

The invention also relates to a first cell plate for use in a cell plate assembly according to the invention. The invention further relates to a second cell plate for use in a cell plate assembly according to the invention. The advantages of the use of such a first cell plate and second cell plate adjoining an anode side of the membrane electrode assembly of a solid-state compressor, as well as the possible characterizing features of these cell plates are already discussed above in relation to the cell plate assembly.

The invention moreover relates to a solid-state compressor for electrochemically compressing a fluid, comprising a membrane electrode assembly enclosed between an cell plate assembly according to the invention and a fluid collection plate, wherein an anode side of the membrane electrode assembly faces towards the second surface of the second cell plate of the cell plate assembly and a cathode side of the membrane electrode assembly faces towards the fluid collection plate. The fluid collection plate hereby functions to collect and convey the compressed fluid away from the compressor cell. The solid-state compressor may be oriented such that the anode side constitutes the bottom side of the membrane electrode assembly, such that the cell plate assembly likewise positioned at the bottom side of the membrane electrode assembly. However, it is also possible that the solid-state compressor is oriented such that the anode side constitutes the top side of the membrane electrode assembly. The solid-state compressor may be a electrochemical hydrogen compressor, but may also be configured for compressing other working fluids such as water or ammonia. The working principle of these solid-state compressors is the same in that it compresses the working fluid by letting the working fluid pass through a membrane electrode assembly.

Finally, the invention relates to a method for operating a solid-state compressor according to the invention, comprising the steps: A) feeding a fluid via a feed line to the channels of a first cell plate channel structure, B) passing the fluid from the channels of a first cell plate channel structure to the channels of a second cell plate channel structure, C) distributing the fluid from the channels of a second cell plate channel structure via passages over an anode side of a membrane electrode assembly, D) ionizing the fluid at the anode side of the membrane electrode assembly, E) passing the ionized fluid through a proton exchange membrane of the membrane electrode assembly, thereby compressing the fluid, and E) collecting the compressed fluid at a cathode side of the membrane electrode assembly. The advantages of this method for operating a solid-state compressor and for supplying working fluid to the anode side of the membrane electrode assembly in particular are already explained in detail with regard to the different possible embodiments of the cell plate assembly according to the invention.

The method may comprise the consecutive step of purging, wherein steps A-F are performed in reverse order, thereby removing impurities from the channel structures on the anode side of the membrane electrode assembly. As was already mentioned in the discussion on the various embodiments of the cell plate assembly, the interconnection of the individual channels of the first cell plate channel structure by means of the channels of the second cell plate channel structure improves purging effectiveness. Namely, the interconnections will effectively remove any dead ends in the channels of the interconnected channel structure that would otherwise trap impurities present in the working fluid. As a result of the lack of dead ends, the backflow of working fluid that is accomplished through purging is able to flow in a single direction towards the inlet feed (which during purging acts as an exhaust) thereby taking with it any impurities accumulated in the channels at the anode side of the membrane electrode assembly.

BRIEF DESCRIPTION OF THE DRAWINGS

In order to further elucidate the invention, exemplary, non-limitative embodiments will be described with reference to the figures. In the figures.

The figures represent specific exemplary embodiments of the invention and should not be considered limiting the invention in any way or form. Throughout the description and the figures corresponding reference numerals are used for corresponding elements.

DESCRIPTION OF THE INVENTION

A solid-state compressor according to the invention comprises a membrane electrode assembly enclosed between a cell plate assembly according to the invention and a fluid collection plate to form a compressor cell. The cell plate assembly comprises a first cell plate and a second cell plate, wherein the second cell plate adjoins the anode side of the membrane electrode assembly. The compressor cell is bounded by two current collector plates that interface the first cell plate and the fluid collection plate respectively. The current collector plates act as a pass-through for electrically connecting the electrodes to a power source. The compressor cell is at opposing sides clamped between an enclosure that keeps a pressure onto the cell stack. The enclosure comprises two flanges that are interconnected near their peripheral edges by an array of bolted joints formed by bolts and nuts.

Figure 1:
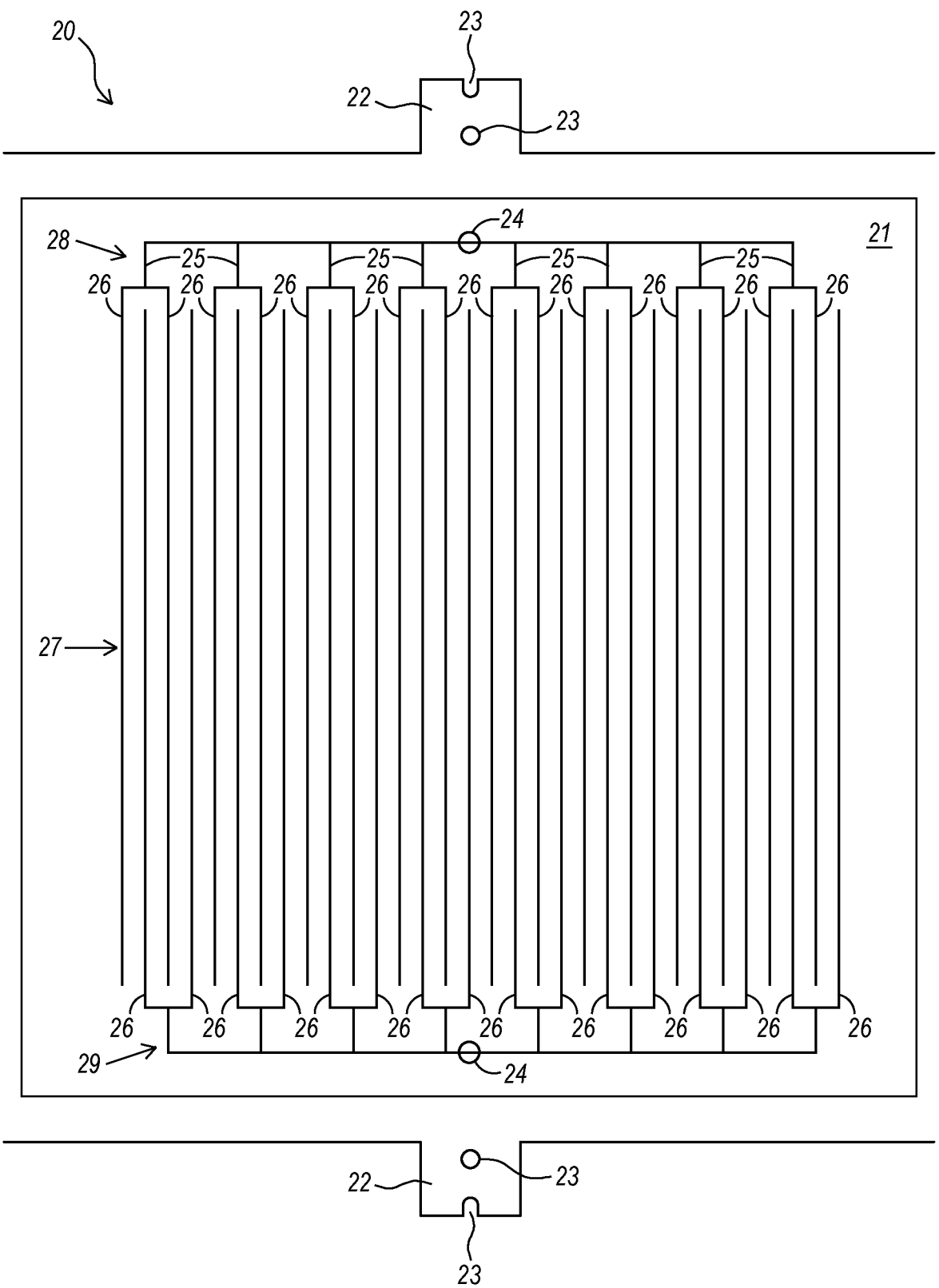
FIG. 1 shows a perspective view on the first surface of a first cell plate of a cell plate assembly according to the invention.

FIG. 1 shows a perspective view on the first surface 21 of a first cell plate 20 of a cell plate assembly according to the invention. The first cell plate 20 is provided with multiple protrusions 22 each provided with recesses 23 that are able to wrap around frame parts of the compressor housing, thereby keeping the first cell plate 20 at a fixed location outlined with the second cell plate (see FIG. 3) and other parts of the compressor cell. The first cell plate 20 is further provided with outlets 24 for the working fluid feed lines. The outlets 24 are each connected to a number of channels 25 that act as subdivisions of the feed line. These subdivisions 25 transfer into the multiple parallel channels 26 that together make up the channel structure 27 of the first cell plate 20. Each of the channels 26 are hereby formed by elongated recesses provided in the first surface 21 of the first cell plate 20. In the depicted configuration, the channel structure 27 comprises two separate and interdigitated channel systems 28, 29, each connected to a different working fluid feed line outlet 24. Other channel structure configurations are however also possible, as is shown in FIGS. 5a-c in further detail.

Figure 2:
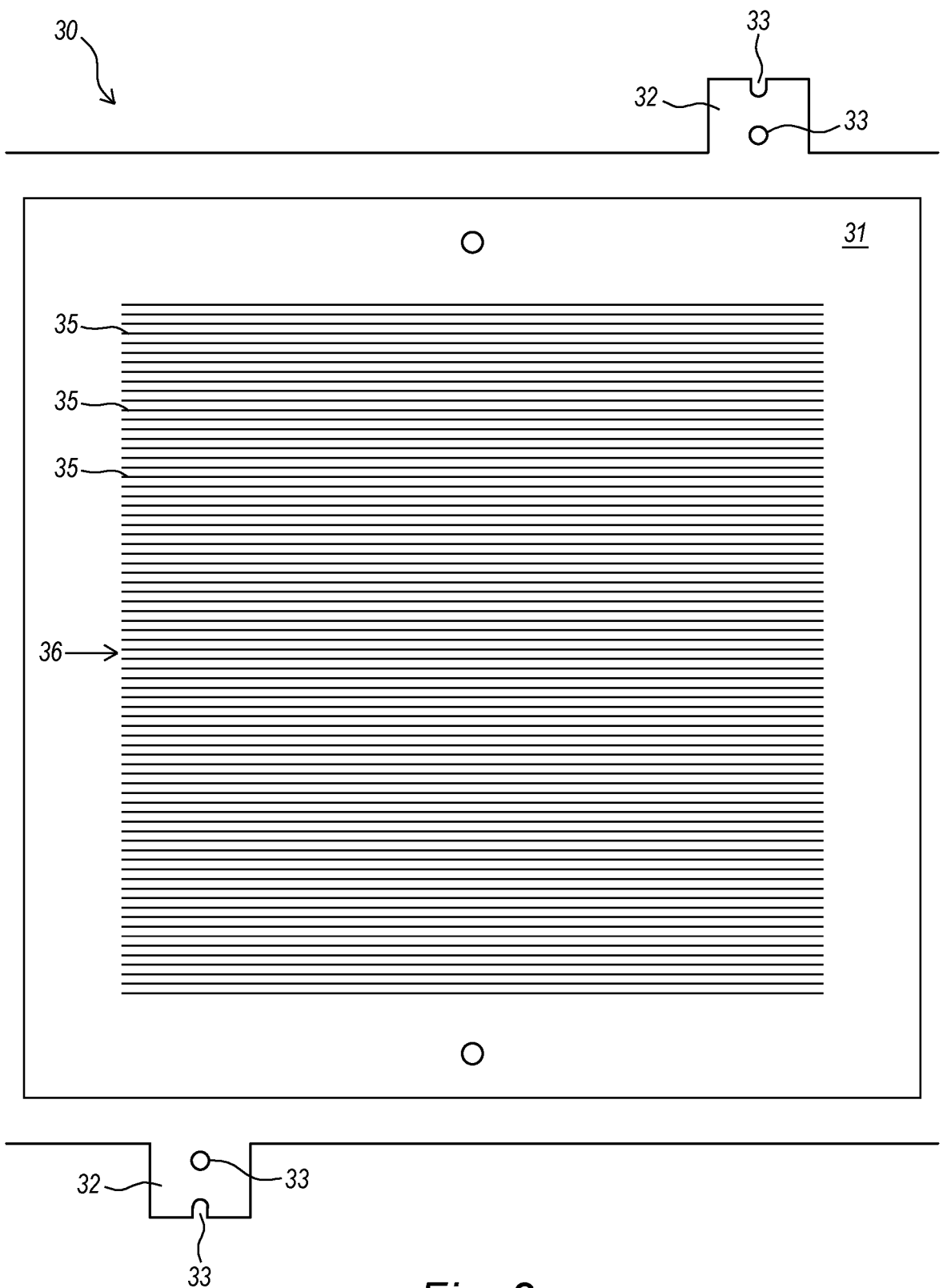
FIG. 2 shows a perspective view on the first surface of a second cell plate of a cell plate assembly according to the invention.

FIG. 2 shows a perspective view on the first surface 31 of a second cell plate 30 of a cell plate assembly according to the invention. Just like the first cell plate 20, the second cell plate 30 is provided with multiple protrusions 32 provided with recesses 33 that are able to wrap around frame parts of the compressor housing. The second cell plate 30 is further provided with holes 34 for the pass-through of feed lines. The second cell plate 30 also comprises multiple parallel channels 35 that together make up the channel structure 36 of the second cell plate 30. Each of the channels 35 are hereby formed by elongated recesses provided in the first surface 31 of the second cell plate 30. The mutual distance between the successive channels 35 of the second cell plate channel structure 36 is smaller than the mutual distance between successive channels 26 of the first cell plate channel structure 27. Moreover, the number of channels 35 in the second cell plate channel structure 36 exceeds the number of channels 26 in the first cell plate channel structure 27.

Figure 3:
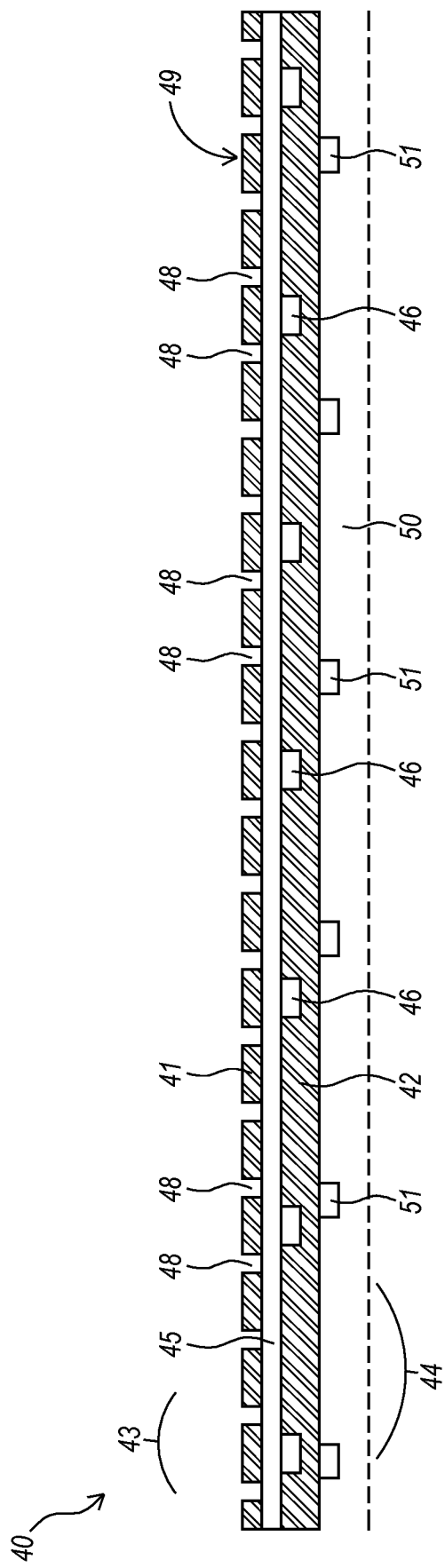
FIG. 3 shows a cross-section of a cell plate assembly according to the invention perpendicular to the cell plate first and second surfaces.

FIG. 3 shows a cross-section of a cell plate assembly 40 according to the invention perpendicular to the cell plate first and second surfaces. The cell plate assembly 40 comprises a second cell plate 41 and a first cell plate 42, wherein each of the cell plates 41,42 are provided with their own channel structure 43,44. The channels 45 of the second cell plate channel structure 43 run perpendicular to the channels 46 of the first cell plate channel structure 44. The channels 45,46 of both channel structures 43,44 hereby extend in the plane of their respective cell plates 41,42. The channels 45,46 of both channel structures 43,44 are interconnected at their points of intersection 47 to create a continuous flow path for the working fluid to be supplied to the membrane electrode assembly. The second cell plate 41 further comprises a number of passages 48 connecting the channel structure 43 with the second surface 49 of the second cell plate 41, which adjoins the membrane. Also shown is a fluid collection plate 50 positioned at the cathode side of a neighbouring membrane electrode assembly. The fluid collection plate 50 is provided with holes 51 for the transport of compressed working fluid away from the compressor cell.

Figure 4A:
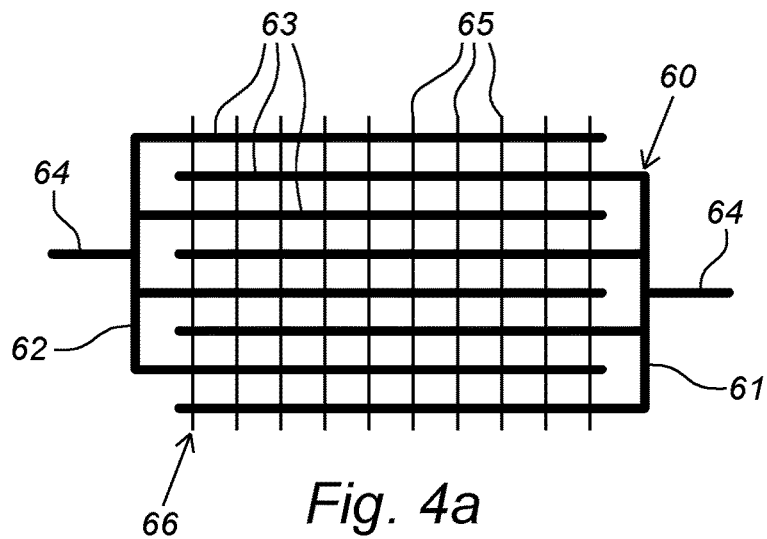
FIGS. 4a-c show schematic representations of different possible channel structure configurations as provided in the cell plates of a cell plate assembly according to the invention.
Figure 4B:
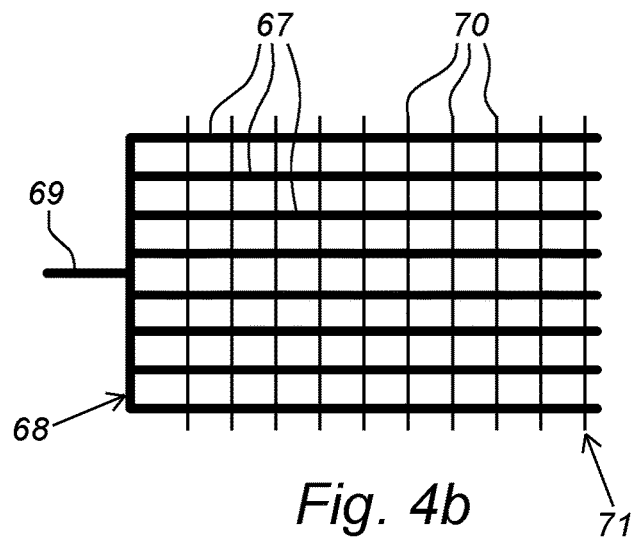
Figure 4C:
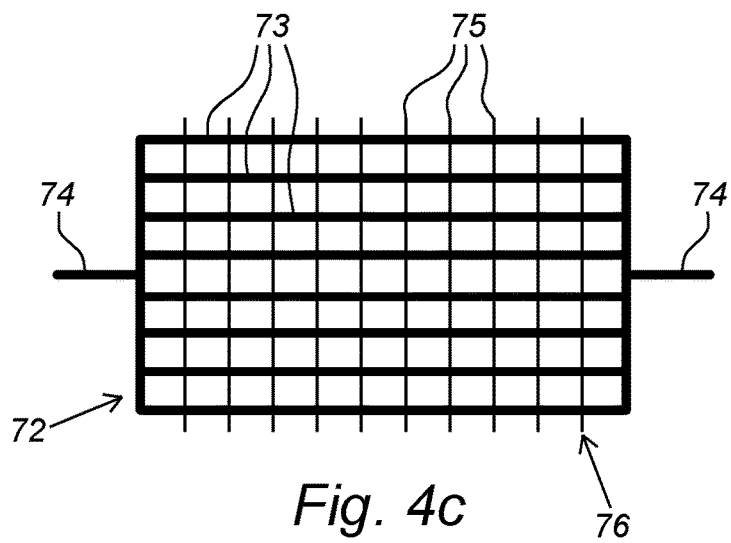

FIGS. 4a-c show schematic representations of different possible channel structure configurations as provided in the cell plates of a cell plate assembly according to the invention. FIG. 5a shows, equal to the cell plate depicted in FIG. 2, a channel structure 60 of the first cell plate comprising two channel systems 61,62 enclosing one another, thereby forming a interdigitated channel structure 60 wherein subsequent channels 63 are part of different channel systems 61,62 that are connected to separate fluid feeds 64. Each of the channels 63 are hereby dead ending. However, as the channels 65 of the second cell plate channel structure 66 interconnect the separate channels 63 of the first cell plate channel structure 60 alternately at both ends of the first cell plate channels 63, a semi flow-by configuration is obtained during purging. Another configuration with dead ending channels 67 of the first cell plate channel structure 68 is shown in FIG. 5b. This time all channels 67 form part of a single channel system connected to a single fluid feed 69. However, just as with the configuration shown in FIG. 5b, the channels 70 of the second cell plate channel structure 71 interconnect the separate channels 67 of the first cell plate channel structure 68. Finally, FIG. 5c shows a channel configuration wherein the first cell plate channel structure 72 comprises a single, continuous channel system, the channels 73 of which are at opposing ends thereof connected to separate fluid feeds 74. The first cell plate channel structure 72 hereby forms a flow-by configuration. Again, the channels 73 of the first cell plate channel structure 72 are interconnected by the channels 75 of the second cell plate channel structure 76.

The invention claimed is:

1. A cell plate assembly for adjoining an anode side of a membrane electrode assembly of a solid-state compressor, comprising:
    a first cell plate having a first length and a first depth comprising a first channel structure incorporated therein comprising multiple channels extending over at least part of the cell plate, each of the multiple channels comprising a second length more than half of the first length of the first cell plate and running parallel to a first surface of the cell plate, each of the multiple channels recessed with a second depth less than the first depth of the first cell plate from the first surface, and running parallel to the first surface of the cell plate, and
    a second cell plate having a third length and a third depth comprising a first surface interfacing the first surface of the first cell plate and having a second channel structure incorporated therein comprising multiple channels recessed with a fourth depth that is less than the third depth of the second cell plate, and thus forming a recessed channel partly through the plate from the first surface of the cell plate, extending over at least part of the cell plate and running parallel to the first surface of the cell plate, alongside the interfacing surfaces,
    wherein the channels of the respective channel structures are interconnected at the interfacing surfaces of the first and second cell plates,
    wherein the second cell plate comprises a number of passages connecting the therein incorporated second channel structure with a second surface of the second cell plate opposing the first surface of the second cell plate, and
    wherein the channels incorporated in the second cell plate enclose an angle with the channels incorporated in the first cell plate.

2. The cell plate assembly according to claim 1, wherein the channels of the second channel structure run substantially perpendicular to the channels of the first channel structure.

3. The cell plate assembly according to claim 1, wherein the channels of the first channel structure have a diameter exceeding that of the channels of the second channel structure.

4. The cell plate assembly according to claim 1, wherein the spacing between subsequent channels of the second channel structure is smaller than the spacing between subsequent channels of the first channel structure.

5. The cell plate assembly according to claim 1, wherein the first cell plate channel structure is connected to a feed line for feeding a working fluid to the channels of said channel structure.

6. The cell plate assembly according to claim 5, wherein the first cell plate channel structure is connected to at least two separate feed lines, each connecting to different, and preferably opposing ends of the channel structure.

7. The cell plate assembly according to claim 6, wherein the first plate channel structure comprises two separate channel systems, each connected to a different one of the separate feed lines, wherein the channels of the separate channel systems are dead ending.

8. The cell plate assembly according to claim 7, wherein the channels of the separate channel systems enclose one another, thereby forming a interdigitated channel structure wherein subsequent channels are part of different channel systems.

9. The cell plate assembly according to claim 7, wherein the channel structure comprises a single, continuous channel system, the channels of which are at opposing ends thereof connected to separate feed lines.

10. The cell plate assembly according to claim 1, wherein the channel structures of the first and second cell plates are formed by elongated recesses provided in the first surface of the second cell plate and the first surface of the first cell plate respectively.

11. A first cell plate for use in a cell plate assembly according to claim 1.

12. A second cell plate for use in a cell plate assembly according to claim 1.

13. A solid-state compressor for electrochemically compressing a fluid, comprising a membrane electrode assembly enclosed between an cell plate assembly according to claim 1 and a fluid collection plate, wherein an anode side of the membrane electrode assembly faces towards the second surface of the second cell plate of the cell plate assembly and a cathode side of the membrane electrode assembly faces towards the fluid collection plate.

14. A method for operating a solid-state compressor according to claim 13 comprising the steps:

A) feeding a fluid via a feed line to the channels of a first cell plate channel structure,
B) passing the fluid from the channels of a first cell plate channel structure to the channels of a second cell plate channel structure,
C) distributing the fluid from the channels of a second cell plate channel structure via passages over an anode side of a membrane electrode assembly,
D) ionizing the fluid at the anode side of the membrane electrode assembly,
E) passing the ionized fluid through a proton exchange membrane of the membrane electrode assembly, thereby compressing the fluid, and
F) collecting the compressed fluid at a cathode side of the membrane electrode assembly.

15. The method according to claim 14, wherein the method comprises the consecutive step of purging, wherein steps A-F are performed in reverse order, thereby removing impurities from the channel structures on the anode side of the membrane electrode assembly.

* * * * *